UNITED STATES PATENT OFFICE.

ALEXANDER D. ELBERS, OF HOBOKEN, NEW JERSEY.

IMPROVEMENT IN PROCESSES OF TREATING MINERAL WOOL.

Specification forming part of Letters Patent No. 194,422, dated August 21, 1877; Reissue No. 7,994, dated December 18, 1877; application filed September 17, 1877.

*To all whom it may concern:*

Be it known that I, ALEXANDER D. ELBERS, of Hoboken, in the county of Hudson and State of New Jersey, have invented a new and useful Improvement in the Treatment of Mineral Wool, of which the following is a specification:

This invention has for its object to prepare mineral wool for use in the arts; and consists in a new manner of preparing a wadding made from mineral wool, to render it properly cohesive, and in treating said wool with bituminous, resinous, or gummy substances under heat, for making the mineral-wool wadding or felting more or less water-proof, and to protect it against atmospheric influences, all as is hereinafter more fully described.

In carrying my invention into effect I proceed as follows: A stream of scoriaceous matter, which is caused to flow from a suitable furnace or receptacle, is acted upon by a jet of air or steam, or by a mechanical agitator, to convert the same into a spray. This spray is subsequently relieved from its shot-like impurities, either by a current of air, which is blown against it, or by other suitable means.

The mineral wool thus produced is conducted into suitable pans or vats, in which it will settle in a very loose mass, so that, for instance, a heap three feet high could be easily compressed to three inches in thickness or less. In fact, it is merely a question of formula to determine the necessary contents of a pan for the required thickness or consistency of felting to construct the pans accordingly. When these pans contain the requisite amount of wool, I press the wool by means of a lid, or in any other well-known mechanical way; or the bottom of the pans may be set loose, so that by reversing a pan the bottom may serve as a lid for compressing the wool, so that the contents of a pan may be pressed, and then the process of blowing or gathering the wool in the pans continued, another pressure made, and so forth. In this manner I may have several compressed sheets of felting or wadding in the pans, and yet allow new and more fibers to accumulate or settle down on the material already pressed.

In order to give more compactness to or to strengthen the sheets of mineral wool thus made, I size or paint the mineral wool while in the pans, or after the sheets have been taken out therefrom. The admixture for this purpose may be plain glue, if the sheets shall be allowed to become stiff; or, if they are to remain pliable, a mixture of glue and glycerine, or equivalent substance, may be used, which will keep the sheets pliable.

If it is desired to use the mineral wool in its loose and uncompressed state—say for filtering or other purposes—it is not compressed in the manner heretofore described, nor is it sized or painted with the glue; but it is acted upon in its loose state by the bituminous, resinous, or gummy substances, in manner hereinafter described. If, however, the mineral wool is to be used in sheets, it may be painted or sized after the bituminous, resinous, or gummy substances are applied, and after the wool has been compressed, as above described.

I propose to use the bituminous, resinous, or gummy substances either in a powdered or liquid state, according to the purpose for which the felting is required, and to apply the same as follows: As the spray of fibers and shot before mentioned is red hot, the heat in the compartment where I keep the pans may be high enough to melt these bituminous, resinous, or gummy substances, which are placed into the same compartment, and to partly transform them into vapor, which condenses on the fibers of mineral wool before they reach the pans; or I may apply these materials in layers or coats between or upon the layers of mineral wool, and then reheat the pans. These substances melt and become partly vaporized at a comparatively low temperature, and they burn at a higher temperature, leaving a spongy carbonic residue. Being hydrocarbons, their vapors, especially under sublimation, permeate the mass of fibers thoroughly, and condense thereon, thereby coating them in such manner as to render them almost water-proof, and to protect them against the influence of atmospheric gases, such as carbonic-acid gas.

For feltings to be used in the lining of refrigerators, or for similar purposes, where the incombustibility of the lining is of no particular value, it may be sufficient to only melt these substances, which, after cooling, will form, with the fibers, a stiff felting. When the felting is to be used for fire-proof purposes, I burn said bituminous, resinous, or gummy substances to such an extent that the residue contained in the felting will be no longer combustible. This kind of felting is soft, pliable, and less compact, but may be made more so by applying to it the aforementioned mixture of glue or glycerine, or equivalent substance.

The different treatments of melting, distilling, and burning these bituminous, resinous, or gummy substances in the mineral wool will partly or entirely prevent the subsequent formation of sulphureted hydrogen from the sulphide of lime, which is often contained in furnace-slag, and in the wool made therefrom. This sulphide of lime, when brought into contact with carbonic acid and water, or with certain diluted acids, changes into carbonate of lime, emitting during such transformation sulphureted hydrogen, which is very objectionable and injurious to health.

To prevent this, I melt, burn, or distill the hydrocarbons before mentioned, whose vapors partly react on and dissolve the sulphide of lime, in the manner before described, and which, besides, cover or coat the fibers in such a manner as to protect them from the further action of gases and moisture on any possible remnants of such injurious substances.

I claim as my invention—

The process of preparing mineral wool, which consists in mixing the mineral wool with bituminous, gummy, or resinous substances while said substances are in a vaporized condition, substantially as described.

ALEXANDER D. ELBERS.

Witnesses:
ERNEST C. WEBB,
F. V. BRIESEN.